United States Patent
Semba et al.

(10) Patent No.: US 7,206,162 B2
(45) Date of Patent: Apr. 17, 2007

(54) SEEK TRAJECTORY GENERATION USING ADAPTIVE FILTERING

(75) Inventors: Tetsuo Semba, San Jose, CA (US); Matthew White, Mountain View, CA (US); Hiroshi Uchida, Kanagawa-ken (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 68 days.

(21) Appl. No.: 11/000,680

(22) Filed: Nov. 30, 2004

(65) Prior Publication Data

US 2006/0114601 A1    Jun. 1, 2006

(51) Int. Cl.
*G11B 5/596* (2006.01)
*G11B 5/58* (2006.01)
*G11B 5/55* (2006.01)

(52) U.S. Cl. .............................. 360/78.04; 360/77.01; 360/78.09

(58) Field of Classification Search ...................... None
See application file for complete search history.

(56) References Cited

U.S. PATENT DOCUMENTS 6,549,364 B1    4/2003    Shih 6,831,809 B2 *  12/2004   Kagami et al. .......... 360/78.09
2004/0037000 A1    2/2004   Yu
2004/0090698 A1    5/2004   Dang et al.

* cited by examiner

*Primary Examiner*—Andrea Wellington
*Assistant Examiner*—Jason Olson
(74) *Attorney, Agent, or Firm*—Townsend and Townsend and Crew LLP

(57) ABSTRACT

Embodiments of the present invention provide a method and a system for generating optimal feedforward signal for the seek control to suppress the RTV (Random Transient Vibrations) and the seek acoustic noise. One aspect is directed to a method of providing a revised feedforward signal using an adaptive filter in a feedforward control system for controlling an actuator to move a head to seek a track and settle on the track of a disk in a disk drive apparatus. The method comprises performing a seek operation of the head using an initial feedforward signal; obtaining an error signal at settling after performing the seek operation; determining filter characteristics of the adaptive filter to minimize the error signal; and implementing the adaptive filter having the determined filter characteristics in the feedforward control system to produce a revised feedforward signal for controlling the actuator for moving the head in the disk drive apparatus.

29 Claims, 4 Drawing Sheets

SEEK TRAJECTORY GENERATION USING ADAPTIVE FILTERING

CROSS-REFERENCES TO RELATED APPLICATIONS

NOT APPLICABLE

BACKGROUND OF THE INVENTION

This invention relates generally to hard disk drive control and, more particularly, to seek trajectory generation using adaptive filtering.

Computer hard disk drives (HDDs) include one or more disks of magnetic storage medium and a disk drive head assembly to read and write data on the magnetic storage medium. Read/write heads typically include a write element comprised of a thin film inductive head and a read element comprised of a Magnetoresistive (MR) sensor. The heads for the disk surfaces of the disk drive are affixed to an actuator or arm that glides across the disk surface to position the head at different track locations. Current is passed to a voice coil motor (VCM) to position the actuator with respect to the disk surface. The amount of torque applied to the actuator is governed by the amount of current in the VCM. The VCM comprises the coil that receives the current and two magnets. During operations, the disk drive components, such as the VCM, can produce vibrations and oscillations induced as a result of the resonance of the components. Such vibrations may result in undesirable head variations and tracking errors.

Two factors that affect the access time that lapses before the head can access the disk include move time and settle time. The move time is the time required for the head to move between tracks. The settle time is the amount of time required, after the actuator has moved the head assembly during a seek, for the heads to stabilize sufficiently for the data to begin to be read or written. The characteristics of the disk drive system and environment can produce oscillations that may increase the settle time and thereby degrade disk performance. Further, error may result if the head overshoots or undershoots the desired track.

In current disk drive systems, to correct for tracking errors resulting from noise and vibrations from components such as the VCM, the disk drive controller will read servo information indicating the actual current position and compare that value read to the desired position. This difference is known as the Position Error Signal (PES). The drive controller will then calculate a current to apply to the VCM to correct any variation in the measured position versus the desired position. Thus, the position feedback controller calculates the desired current to be applied to the VCM to generate torque to move the actuator arm. The current is supplied by an amplifier between the feedback controller output and the VCM input.

In some cases, the seek trajectory is optimized for seek speed to move the actuator arm quickly, but it is also desirable for the head to settle quickly over the correct data track. A typical approach is the bang-bang approach in which, for instance, a positive current moves the head to the new position and a negative current brakes the head at the new position. Such a current will appear as two step function pulses of opposite polarity (i.e., a single square wave). The detailed physics involved, however, makes the use of the bang-bang approach a non-ideal solution. A number of small modifications have been used for bang-bang VCM current vector to improve its performance by moving the head to the new track quickly while minimizing the settle time at the desired track. One example involves the Fourier seek method as described in U.S. Pat. No. 6,549,364.

During an HDD seek operation, the actuator moves the head to the target position as quickly as possible. To reduce the seek time, the amplitude of the current is increased using a generally square or rectangular waveform. This will generate RTV (Random Transient Vibrations) due to mechanical motion and acoustic noise from propagation of the vibration. It is desirable to design the seek control trajectory with a smoother waveform to produce smaller RTV and/or smaller seek acoustic noise, but the existing design method involves trial and error and it may not be optimum for specific actuator/drive dynamics.

BRIEF SUMMARY OF THE INVENTION

Embodiments of the present invention provide a method and a system for generating optimal feedforward signal for the seek control to suppress the RTV and the seek acoustic noise. The seek curve is optimized based on the actuator/drive dynamics, and the seek time is minimized. The technique can be used for seek control using two degree-of-freedom control (i.e., feedback and feedforward), whereby the feedforward signal is used to move the actuator on a desired trajectory. The feedback signal is used to correct the variance of the position error. An adaptive filter is employed. First, the methodology provides adaptive filter training to minimize the vibration and/or acoustic noise. Then the trained adaptive filter is implemented in the feedforward control system to generate an improved feedforward signal for controlling the actuator or plant of the apparatus.

An aspect of the present invention is directed to a method of providing a revised feedforward signal using an adaptive filter in a feedforward control system for controlling an actuator to move a head to seek a track and settle on the track of a disk in a disk drive apparatus. The method comprises performing a seek operation of the head using an initial feedforward signal; obtaining an error signal at settling after performing the seek operation; determining filter characteristics of the adaptive filter to minimize the error signal; and implementing the adaptive filter having the determined filter characteristics in the feedforward control system to produce a revised feedforward signal for controlling the actuator for moving the head in the disk drive apparatus.

In some embodiments, the initial feedforward signal is a bang-bang type feedforward signal. The error signal comprises a position error signal or an acoustic noise or both a position error signal and an acoustic noise. The adaptive filter is a finite impulse response (FIR) filter. The adaptive filter has a constant DC gain corresponding to a desired track seek length. Determining the filter characteristics comprises solving for filter coefficients of the adaptive filter based on the error signal. Solving for the coefficients of the adaptive filter comprises using a Least-Mean-Square method to minimize a filter output of the adaptive filter. Determining the filter characteristics comprises setting an order of the adaptive filter initially to a small number and then increasing the order if necessary until a filtered error signal becomes sufficiently small to meet a target settling track misregistration (TMR).

In specific embodiments, the method further comprises, prior to implementing the adaptive filter in the feedforward control system, using the revised feedforward signal to iteratively and repeatedly perform the following to generate subsequent revised feedforward signals until a desired condition of improved seek and settle of the head is met:

performing a seek operation of the head using a previous revised feedforward signal; obtaining an error signal at settling after performing the seek operation using the previous revised feedforward signal; determining filter characteristics of the adaptive filter to minimize the error signal using the previous revised feedforward signal; and using the adaptive filter having the determined filter characteristics in the feedforward control system to produce a current revised feedforward signal. In addition, different adaptive filters may be used for different ranges of seek lengths, and the method comprises determining the filter characteristics of the different adaptive filters and implementing the different adaptive filters for the different ranges of seek lengths. The desired condition may comprise a target settling track misregistration (TMR).

In accordance with another aspect of the present invention, a system for controlling an actuator to move a head to seek a track and settle on the track of a disk in a disk drive apparatus comprises a feedforward controller configured to provide a feedforward signal; an adaptive filter configured to filter the feedforward signal to generate a filtered feedforward signal; and an actuator configured to receive the filtered feedforward signal for moving the head in the disk drive apparatus. The adaptive filter is trained to minimize an error signal of performing a seek operation of the head using the filtered feedforward signal.

In some embodiments, the adaptive filter is trained by performing a seek operation of the head using an initial feedforward signal; obtaining an error signal at settling after performing the seek operation; determining filter characteristics of the adaptive filter to minimize the error signal; and implementing the adaptive filter having the determined filter characteristics in the feedforward control system to produce a revised feedforward signal.

Another aspect of the invention is directed to a system for generating a feedforward signal for controlling an actuator to move a head to seek a track and settle on the track of a disk in a disk drive apparatus. The system comprises an adaptive filter configured to filter a feedforward signal to generate a filtered feedforward signal to be applied to the actuator for moving the head in the disk drive apparatus; and a computer-readable storage medium including a computer program. The program includes code for obtaining an error signal at settling after performance of a seek operation of the head using an initial feedforward signal to move the head in the disk drive apparatus; and code for determining filter characteristics of the adaptive filter to minimize the error signal.

In some embodiments, the code for determining the filter characteristics comprises code for solving for filter coefficients of the adaptive filter based on the error signal. The code for determining the filter characteristics comprises code for setting an order of the adaptive filter initially to a small number and then increasing the order if necessary until a filtered error signal becomes sufficiently small to meet a target settling track misregistration (TMR).

DETAILED DESCRIPTION OF THE INVENTION

Figure 1:
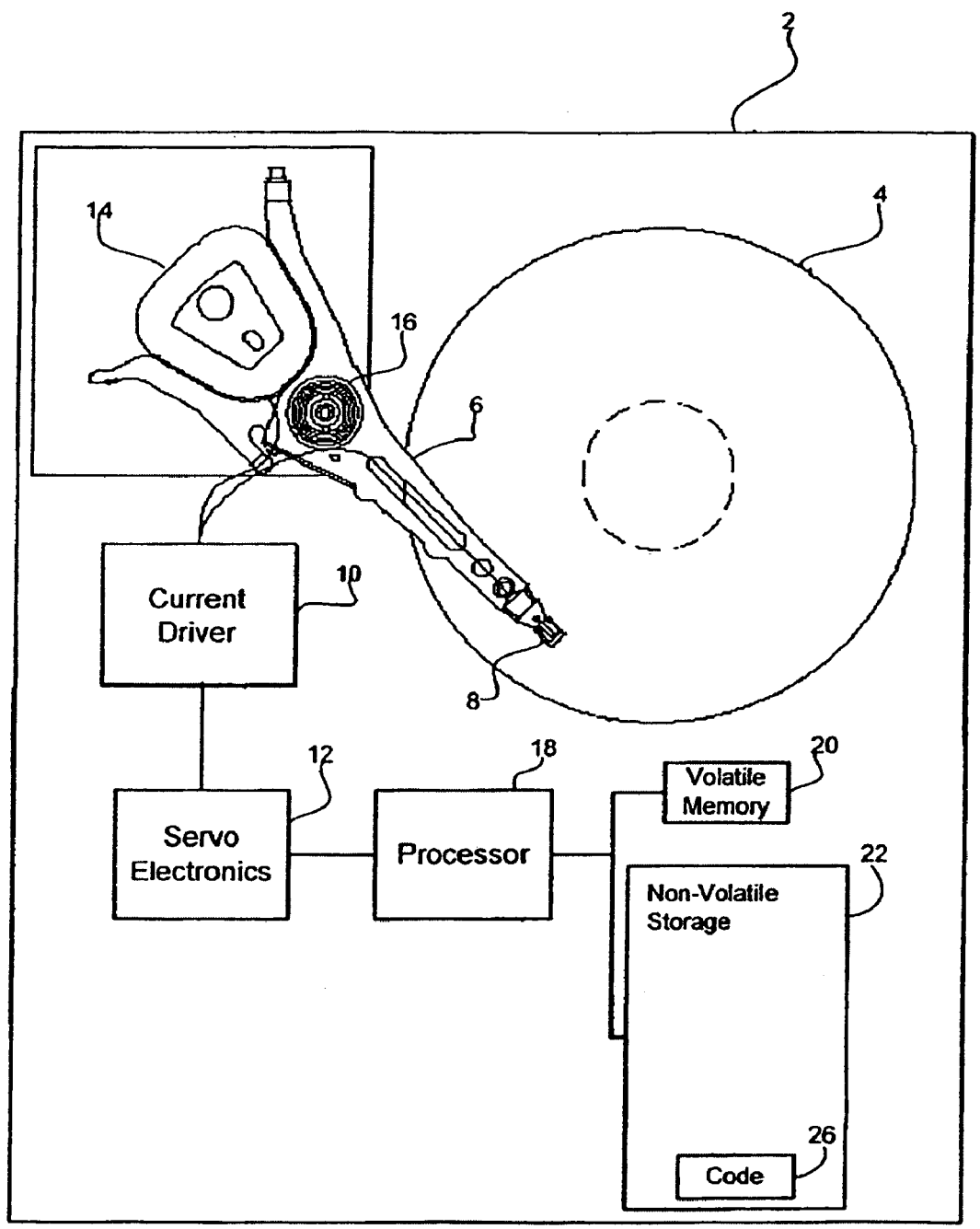
FIG. 1 shows a disk drive architecture in which aspects of the present invention may be implemented.

FIG. 1 shows a disk drive system 2, including one or more rotating disks 4 (only one is shown), an actuator assembly 6 to move a head assembly 8 across the disk 4 surface. The disk drive system 2 further includes a current driver 10 that converts the digital signal of a calculation from servo electronics 12 or processor 18 to actual current that is applied to a voice coil motor (VCM) 14. The VCM 14 comprises a coil that sits between two magnets. The current driver 10 applies current to the VCM 14 to cause the coil to react and move through a magnetic field to move the actuator 6.

In certain implementations, the head 8 is a magnetoresistive (MR) head device. However, in alternative implementations, the head 8 may be constructed of other materials known in the art. The servo electronics 12 provides a closed loop feedback system to ensure that the head follows the tracks accurately and to control smooth transitions when the head "seeks" from one track location to another track. The servo electronics 12 calculates the position error signal (PES) from the desired position and from pre-recorded servo information either on a dedicated servo disk or on servo sectors interspersed among the data sectors on the disk. The servo electronics 12 uses the servo information to determine the PES, which is the signal proportional to the difference between the ideal center line tracking and the actual positions of the head assembly 8. The servo electronics 12 may then calculate a corrective position signal based on the PES. The actuator 6 pivots around a shaft 16 in response to the torque produced by the VCM 14.

A processor 18 manages read/write operations and controls other disk operations. The processor 18 utilizes a volatile memory 20, such as a random access memory (RAM) or registers as a working memory in which instructions and data are temporarily loaded for program execution. A non-volatile storage 22, such as a read-only memory (ROM), programmable ROM (PROM), erasable programmable ROM (EPROM), flash memory, etc., stores program instructions and constants, referred to as code 26, loaded and executed by the processor 18 to perform the disk drive operations. Alternatively, the code 26 described herein as performed by processor 18 along with the volatile memory 20 and non-volatile storage 22 may be implemented as hardware, such as an Application Specific Integrated Circuit (ASIC).

Figure 2:
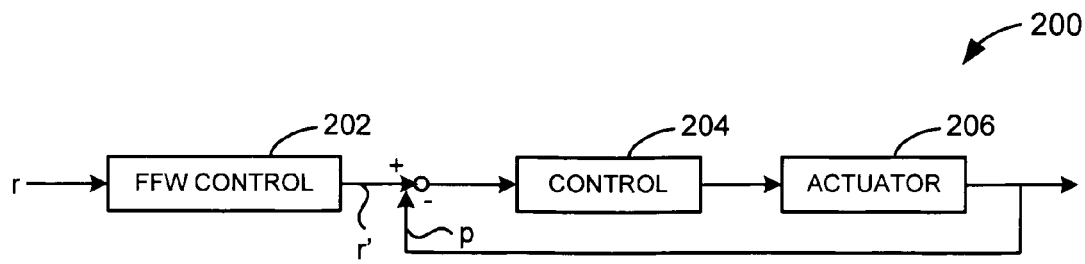
FIG. 2 is a schematic diagram of a feedforward control system in which aspects of the invention may be implemented.

FIG. 2 shows a feedforward control system 200 in which aspects of the invention may be implemented. The reference signal r is processed by a feedforward controller 202 to produce a feedforward signal r', which is then combined with a feedback signal p to obtain (r'−p). The combined signal (r'−p) is processed by a controller 204 to generate a current, which is then applied to the actuator or plant 206 to produce an output signal that is used as the feedback signal p in the feedback loop. The combined signal (r'−p) represents an error signal such as the position error signal (PES) or the like.

Figure 3:
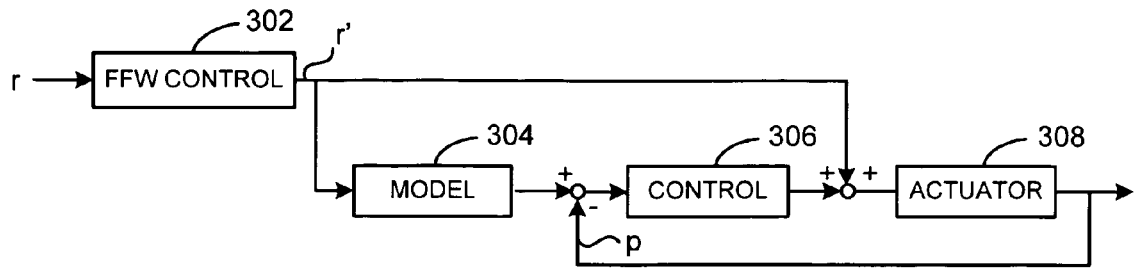
FIG. 3 is a schematic diagram of another feedforward control system in which aspects of the invention may be implemented.

FIG. 3 shows another feedforward control system 300 which may be referred to as the model—following feedforward system. The reference signal r is processed by a feedforward controller 302 to produce a feedforward signal r'. In one branch, the feedforward signal r' is processed by the model (1/s²) 304, which represents a double integration over time to generate a position signal from an acceleration signal. The integrated feedforward signal (1/s²)r' is combined with a feedback signal p to obtain [(1/s²)r'−p]. The combined signal [(1/s²)r'−p] is processed by a controller 306 and then combined with the feedforward signal r' to generate a current. The current is applied to the actuator or plant 308 to produce an output signal that is used as the feedback signal p in the feedback loop. The combined signal [(1/s²) r'−p] represents an error signal such as the position error signal (PES) or the like.

Figure 4:
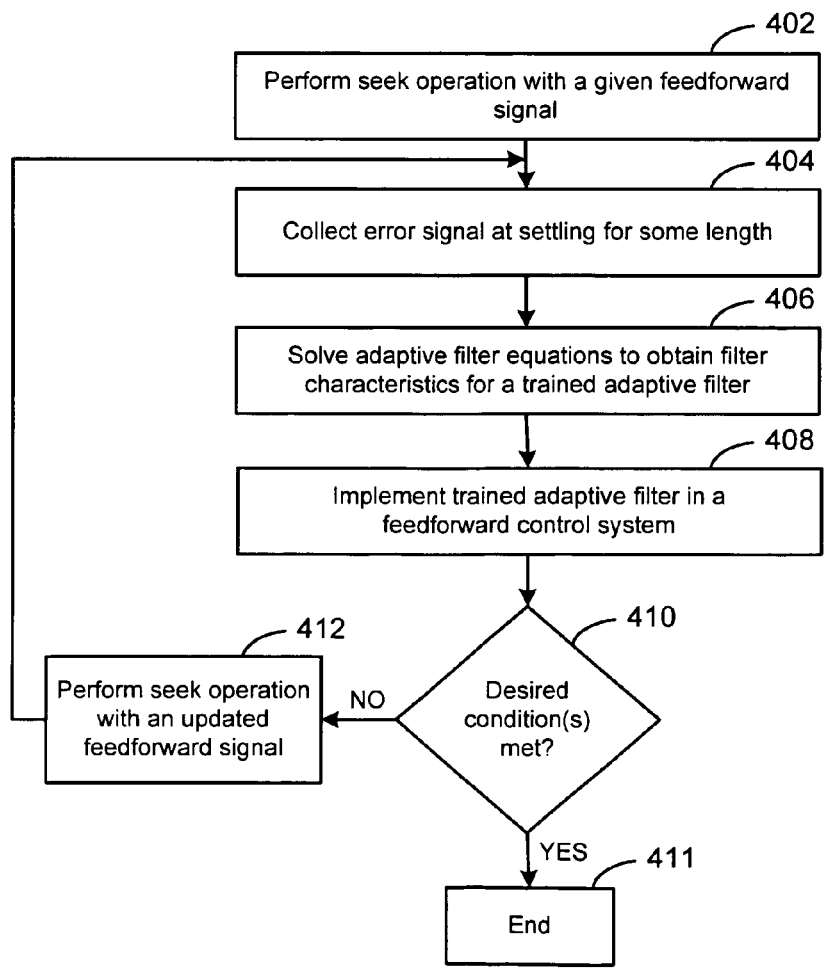
FIG. 4 is a flow diagram of generating an improved feedforward signal using adaptive filtering according to an embodiment of the present invention.

FIG. 4 is a flow diagram of generating an improved feedforward signal using adaptive filtering according to an embodiment of the present invention. An adaptive filter is provided in a feedforward control system. In step 402, the system performs the seek operation with any given feedforward signal. A signal for shorter seek time such as the bang-bang type is preferred. Step 404 involves collecting the error signal (e.g., the PES and/or the acoustic noise) at settling for some length, i.e., after the feedforward control input signal becomes zero. In step 406, the adaptive filter equations are solved to obtain the filter characteristics that will minimize the error signal and/or the acoustic noise, so as to reduce the settling time of the actuator. In particular, for example, the filter coefficients of the adaptive filter are calculated based on the error signal and/or noise signal using an adaptive technique such as the Least-Mean Square (LMS) method. See, e.g., Adaptive Signal Processing, B. Widrow and S. D. Stearns, Prentice-Hall, 1985. Steps 402–406 provide adaptive filter training. In step 408, the trained adaptive filter is implemented in a feedforward control system to generate an improved feedforward signal.

Figure 5:
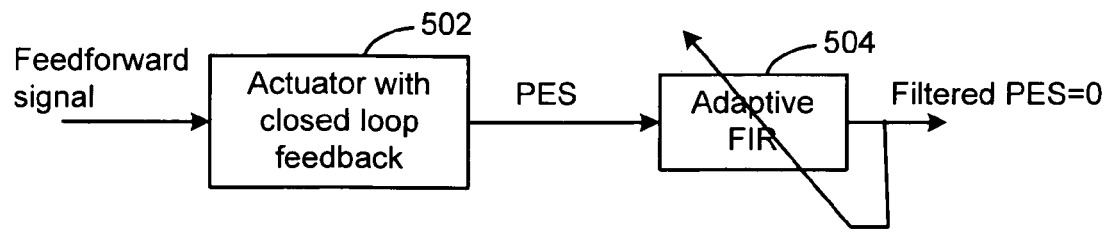
FIG. 5 is a schematic diagram illustrating an adaptive filter training scheme according to an embodiment of the present invention.

FIG. 5 is a schematic diagram illustrating an adaptive filter training scheme (steps 402–406) according to an embodiment of the present invention. A feedforward signal (e.g., a bang-bang type signal) is applied to an actuator or plant with closed loop feedback 502 to produce an output signal representing an error signal with respect to a reference signal (e.g., the PES). The error signal and/or the acoustic noise at settling for some length is/are collected. The adaptive filter 504 is used to minimize the error signal and/or the acoustic noise. The adaptive filter equations are solved to obtain the filter characteristics that will minimize the error signal and/or the acoustic noise, so as to reduce the settling time of the actuator and/or the acoustic noise.

The adaptive filter may be a finite impulse response (FIR) filter, an infinite impulse response (IIR) filter, or the like. The FIR filter is generally preferred due to the finite impulse response characteristics that will produce a shorter settling time. The impulse response of the FIR filter whose order is N is assumed to be h(k). The order N of the filter corresponds to the number of notches of the filter at which minimum gain is sought to eliminate or reduce the effects of the vibration components. The error signal (e.g., PES) and the FIR filter output are designated as u(n) and y(n), respectively. The output of the adaptive filter (e.g., FIR filter) can be expressed as $$y(n) = \sum_{k=0}^{N} h(k)u(n-k)$$

For a given seek length, a DC gain of the FIR filter is assumed to be equal to one.

$$\sum_{k=0}^{N} h(k) = 1$$

Then the filter output is $$\begin{aligned} y(n) &= \sum_{k=0}^{N-1} h(k)u(n-k) + h(N)u(n-N) \\ &= \sum_{k=0}^{N-1} h(k)u(n-k) + \left(1 - \sum_{k=0}^{N-1} h(k)\right)u(n-N) \\ &= \sum_{k=0}^{N-1} [h(k)(u(n-k) - u(n-N))] + u(n-N) \end{aligned}$$

The filter coefficients of the adaptive filter are calculated based on the error signal and/or noise signal using an adaptive technique such as the LMS method. The optimal filter h(k) minimizes the following $$y(n) = \sum_{k=0}^{N-1} [h(k)(u(n-k) - u(n-N))] + u(n-N).$$

Since many samples of the filter output is necessary to get accurate h(k), the following cost function is introduced and is minimized.

$$J = \sum_{n=0}^{M} y(n)^2$$

The rest of the process is the same as the conventional LMS (Least-Mean-Square) method.

$$\frac{\partial J}{\partial h(i)} = \sum_{n=0}^{M} \left[2y(n)\frac{\partial y(n)}{\partial h(i)}\right] =$$

$$\sum_{n=0}^{M} \left[2\left\{\sum_{k=0}^{N-1}[h(k)(u(n-k)-u(n-N))]+u(n-N)\right\}\{u(n-i)-u(n-N)\}\right]$$

If the following parameters are introduced, the equations will be simplified.

$$V_{i,k}(n) = \{u(n-k) - u(n-N)\}\{u(n-i) - u(n-N)\}$$

$$W_i(n) = u(n-N)\{u(n-i) - u(n-N)\}$$

$$\frac{\partial J}{\partial h(i)} = \sum_{n=0}^{M}\left[2\left\{\sum_{k=0}^{N-1}[h(k)V_{i,k}(n)]\right\}\right] + \sum_{n=0}^{M}[2W_i(n)] =$$

$$\sum_{k=0}^{N-1}\left[2h(k)\left\{\sum_{n=0}^{M}V_{i,k}(n)\right\}\right] + \sum_{n=0}^{M}[2W_i(n)]$$

Since the optimal filter is at $$\frac{\partial J}{\partial h(i)} = 0 \text{ for } 0 < i < N-1,$$

the matrix form is $$\begin{bmatrix} -\sum_{n=0}^{M} W_0(n) \\ \vdots \\ -\sum_{n=0}^{M} W_i(n) \\ \vdots \end{bmatrix} = \begin{bmatrix} \sum_{n=0}^{M} V_{0,0}(n) & \cdots & \sum_{n=0}^{M} V_{0,N-1}(n) \\ \vdots & \cdots & \vdots \\ \sum_{n=0}^{M} V_{i,0}(n) & \cdots & \sum_{n=0}^{M} V_{i,N-1}(n) \\ \vdots & \cdots & \vdots \end{bmatrix} \begin{bmatrix} h(0) \\ \vdots \\ h(N-1) \end{bmatrix}.$$

Then the optimal filter impulse response is obtained as follows, $$\begin{bmatrix} h(0) \\ \vdots \\ h(N-1) \end{bmatrix} = \begin{bmatrix} \sum_{n=0}^{M} V_{0,0}(n) & \cdots & \sum_{n=0}^{M} V_{0,N-1}(n) \\ \vdots & \cdots & \vdots \\ \sum_{n=0}^{M} V_{i,0}(n) & \cdots & \sum_{n=0}^{M} V_{i,N-1}(n) \\ \vdots & \cdots & \vdots \end{bmatrix}^{-1} \begin{bmatrix} -\sum_{n=0}^{M} W_0(n) \\ \vdots \\ -\sum_{n=0}^{M} W_i(n) \\ \vdots \end{bmatrix}$$

$$h(N) = 1 - \sum_{k=0}^{N-1} h(k).$$

The coefficients of the FIR filter corresponds to these h(k) values.

The adaptive filter 504 has a constant DC gain corresponding to the desired track seek length. During the training of the adaptive filter, the initial order of the filter can be set to a small number and then increased until the filtered error signal and/or acoustic noise becomes/become sufficiently small to meet the target settling TMR (Track Misregistration). More specifically, for example, the initial seek operation is performed with a generic bang-bang seek trajectory or the particular HDD's default seek trajectory. Steps 402–408 are performed to obtain the first ideal trajectory. Referring again to FIG. 4, step 410 determines whether the desired condition(s) is or are met. If so, the training ends (step 411). If not, the system performs a seek operation with an updated or revised feedforward signal using the updated adaptive filter (step 412). Steps 412 and 404–408 are repeated in an iterative process until the desired conditions are met (e.g., target settling TMR).

Furthermore, different adaptive filters may be used for different ranges of seek lengths. For instance, optimum filter characteristics are determined for seek from the ID (inner diameter) to the OD (outer diameter) of the magnetic disk, for seek from the ID to the MD (middle diameter), from the MD to the OD, and the like. This is desirable in cases where the characteristics of the RTV changes depending on the location of the magnetic disk.

Figure 6:
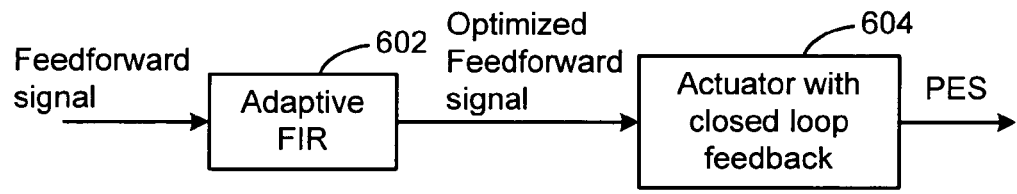
FIG. 6 is a schematic diagram illustrating the implementation of a trained adaptive filter in a feedforward control system according to an embodiment of the present invention.

In FIG. 6, the trained adaptive filter 602 is implemented in a feedforward control system which may be any suitable system such as those shown in FIG. 2 and FIG. 3. Since the transfer function from the feedforward signal to the PES in FIG. 6 is the same as that from the feedforward signal to the filtered PES in FIG. 5, the trained adaptive filter also minimizes the PES in FIG. 6 when the filtered PES in FIG. 5 is minimized. The trained adaptive filter 602 optimizes the feedforward signal to produce an improved feedforward signal which is then used to drive the actuator 604 to produce an output with a reduced error signal and/or acoustic noise so as to reduce the settling time of the actuator 604.

Figure 7:
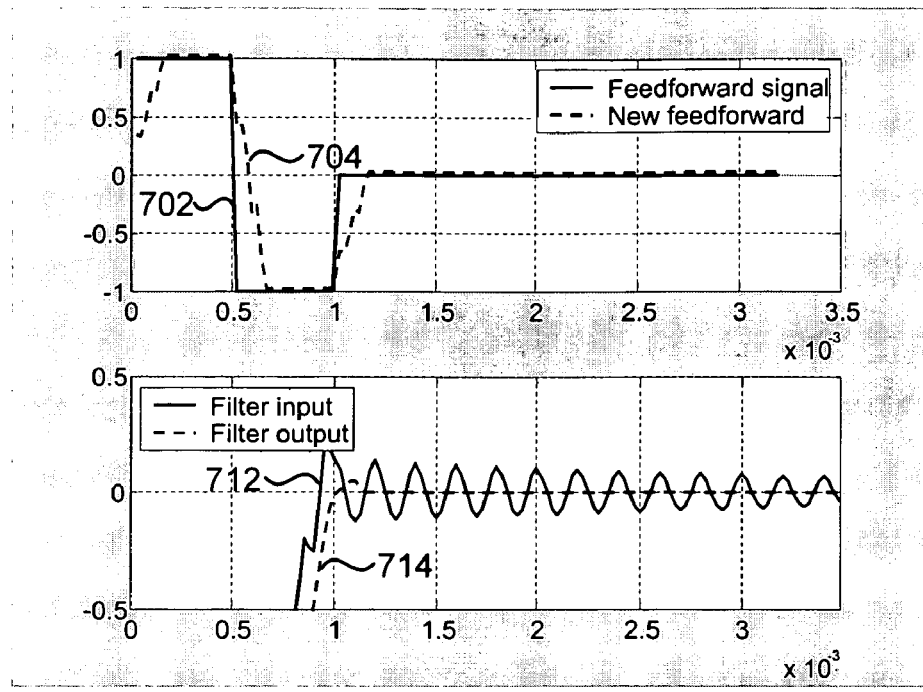
FIG. 7 shows simulation results of the original feedforward signal and the improved feedforward signal after implementing the trained adaptive filter in the feedforward control system.

FIG. 7 shows simulation results of the original feedforward signal and the improved feedforward signal after implementing the trained adaptive filter in the feedforward control system. The original signal 702 is the bang-bang type signal which produces a bang-bang type vibration 712 at settling. After implementation of the trained adaptive filter in the feedforward control system, the improved feedforward signal 704 produces a vibration 714 that has a much shorter settling time.

Figure 8:
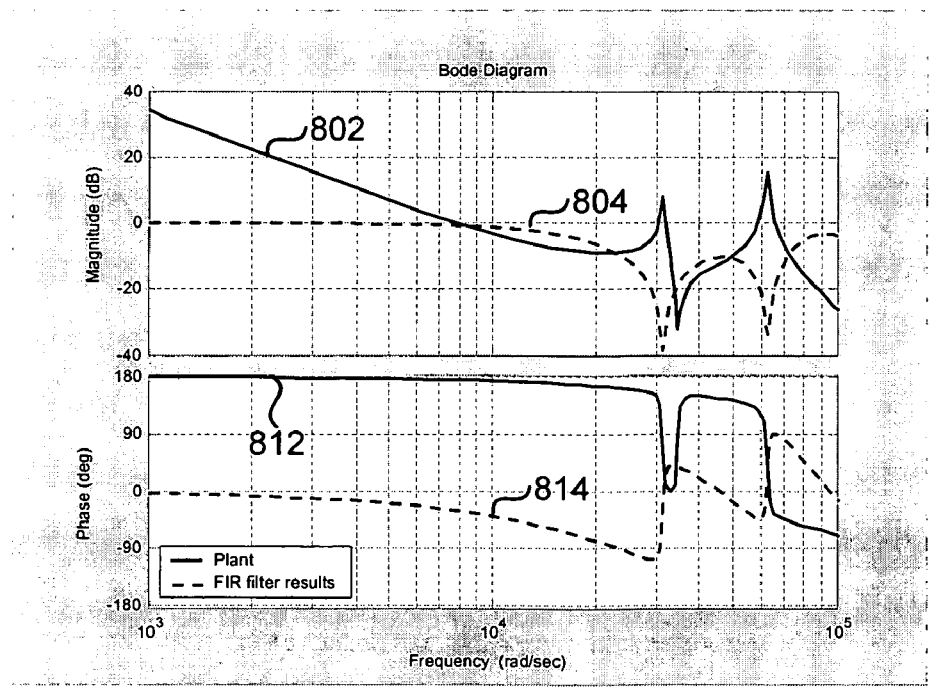
FIG. 8 shows simulation results of the transfer function of actuator dynamics and the transfer function of the trained adaptive filter in the feedforward control system.

FIG. 8 shows simulation results of the transfer function of actuator dynamics and the transfer function of the trained adaptive filter in the feedforward control system. The figure shows the magnitude 802 and phase 812 of the transfer function of the actuator or plant dynamics, and the magnitude 804 and phase 814 of the transfer function of the trained adaptive filter.

The above method may be implemented in software or firmware, and be stored in a computer-readable storage medium such as the non-volatile storage 22 for execution by a computer processor such as the processor 18.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims along with their full scope of equivalents.

What is claimed is:

1. A method of providing a feedforward signal using an adaptive filter in a feedforward control system for controlling an actuator to move a head to seek a target track and settle on the target track of a disk in a disk drive apparatus, the method comprising:
    performing a first seek operation to move the head to a first target track using an initial feedforward signal;
    obtaining an error signal at settling after the initial feedforward signal becomes zero;
    determining filter characteristics of the adaptive filter to minimize the error signal; and
    implementing the adaptive filter having the determined filter characteristics in the feedforward control system to produce a feedforward signal for controlling the actuator for moving the head in the disk drive apparatus during a second seek operation to move the head to a second target track.

2. The method of claim 1 wherein the initial feedforward signal is a bang-bang type feedforward signal.

3. The method of claim 1 wherein the error signal comprises a position error signal or an acoustic noise or both a position error signal and an acoustic noise.

4. The method of claim 1 wherein the adaptive filter is a finite impulse response (FIR) filter.

5. The method of claim 1 wherein the adaptive filter has a constant DC gain corresponding to a desired track seek length.

6. The method of claim 1 wherein determining the filter characteristics comprises solving for filter coefficients of the adaptive filter based on the error signal.

7. The method of claim 6 wherein solving for the filter coefficients of the adaptive filter comprises using a Least-Mean-Square method to minimize a filter output of the adaptive filter.

8. The method of claim 1 wherein determining the filter characteristics comprises setting an order of the adaptive filter initially to a small number and then increasing the order if necessary until a filtered error signal becomes sufficiently small to meet a target settling track misregistration (TMR).

9. The method of claim 1 further comprising, prior to implementing the adaptive filter in the feedforward control system, using a revised feedforward signal to iteratively and repeatedly perform the following to generate subsequent revised feedforward signals until a desired condition of improved seek and settle of the head is met:

performing another seek operation of the head using a revised feedforward signal produced from an adaptive filter having previously determined filter characteristics;

obtaining an error signal at settling after performing the seek operation using the revised feedforward signal; and determining filter characteristics of the adaptive filter to minimize the error signal.

10. The method of claim 9 wherein the desired condition comprises a target settling track misregistration (TMR).

11. The method of claim 1 wherein different adaptive filters are used for different ranges of seek lengths, and wherein the method comprises determining the filter characteristics of the different adaptive filters and implementing the different adaptive filters for the different ranges of seek lengths.

12. The method of claim 1, where the first seek operation has a first seek length, and wherein the second seek operation has a second seek length substantially equal to the first seek length.

13. The method of claim 1, further comprising:

determining filter characteristics of different adaptive filters for different seek lengths; and implementing an appropriate adaptive filter for a seek operation having a specified seek length, wherein the appropriate adaptive filter has filter characteristics determined for that seek length.

14. A system for controlling an actuator to move a head to seek a target track and settle on the target track of a disk in a disk drive apparatus, the system comprising:

a feedforward controller configured to provide a feedforward signal;

an adaptive filter configured to filter the feedforward signal to generate a filtered feedforward signal; and an actuator configured to receive the filtered feedforward signal for moving the head in the disk drive apparatus to a second target track;

wherein the adaptive filter is trained to minimize an error signal obtained at settling after an initial feedforward signal becomes zero for a seek operation moving the head to a first target track.

15. The system of claim 14 wherein the feedforward controller configured to provide a bang-bang type feedforward signal.

16. The system of claim 14 wherein the error signal comprises a position error signal or an acoustic noise or both a position error signal and an acoustic noise.

17. The system of claim 14 wherein the adaptive filter is a finite impulse response (FIR) filter.

18. The system of claim 14 wherein the adaptive filter has a constant DC gain corresponding to a desired track seek length.

19. The system of claim 14 wherein the adaptive filter is trained by:

performing a first seek operation to move the head to the first target track using an initial feedforward signal;

obtaining an error signal at settling after the initial feedforward signal becomes zero; and determining filter characteristics of the adaptive filter to minimize the error signal.

20. The system of claim 19 wherein determining the filter characteristics comprises solving for filter coefficients of the adaptive filter based on the error signal.

21. The system of claim 20 wherein solving for the filter coefficients of the adaptive filter comprises using a Least-Mean-Square method to minimize a filter output of the adaptive filter.

22. The system of claim 19 wherein determining the filter characteristics comprises setting an order of the adaptive filter initially to a small number and then increasing the order if necessary until a filtered error signal becomes sufficiently small to meet a target settling track misregistration (TMR).

23. The system of claim 19 wherein, prior to implementing the adaptive filter in the feedforward control system, using a revised feedforward signal to iteratively and repeatedly perform the following to generate subsequent revised feedforward signals until a desired condition of improved seek and settle of the head is met:

performing another seek operation of the head using a revised feedforward signal produced from an adaptive filter having previously determined filter characteristics;

obtaining an error signal at settling after performing the seek operation using the revised feedforward signal; and determining filter characteristics of the adaptive filter to minimize the error signal.

24. The system of claim 23 wherein the desired condition comprises a target settling track misregistration (TMR).

25. The system of claim 19 wherein different adaptive filters are used for different ranges of seek lengths, and wherein the filter characteristics of the different adaptive filters are determined and implemented for the different ranges of seek lengths.

26. A system for generating a feedforward signal for controlling an actuator to move a head to seek a track and settle on the track of a disk in a disk drive apparatus, the system comprising:

an adaptive filter configured to filter a feedforward signal to generate a filtered feedforward signal to be applied to the actuator for moving the head in the disk drive apparatus; and a computer-readable storage medium including a computer program which includes code for obtaining an error signal at settling after performance of a seek operation of the head using an initial feedforward signal to move the head in the disk drive apparatus; and code for determining filter characteristics of the adaptive filter to minimize the error signal.

wherein the code for determining the filter characteristics comprises code for setting an order of the adaptive filter initially to a small number and then increasing the order if necessary until a filtered error signal becomes sufficiently small to meet a target settling track misregistration (TMR).

27. The system of claim 26 wherein the adaptive filter is a finite impulse response (FIR) filter.

28. The system of claim 26 wherein the code for determining the filter characteristics comprises code for solving for filter coefficients of the adaptive filter based on the error signal.

29. The system of claim 28 wherein solving for the filter coefficients of the adaptive filter comprises using a Least-Mean-Square method to minimize a filter output of the adaptive filter.

* * * * *